US011345775B2

(12) United States Patent
Klesczewski et al.

(10) Patent No.: US 11,345,775 B2
(45) Date of Patent: May 31, 2022

(54) POLYURETHANE FOAMS BASED ON POLYETHERCARBONATE POLYOLS

(71) Applicant: COVESTRO DEUTSCHLAND AG, Leverkusen (DE)

(72) Inventors: Bert Klesczewski, Cologne (DE); Jörg Hofmann, Krefeld (DE); Karsten Malsch, Radevormwald (DE); Nicole Welsch, Cologne (DE); Klaus Lorenz, Dormagen (DE); Hartmut Nefzger, Pulheim (DE); Kai Laemmerhold, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 1 day.

(21) Appl. No.: 15/781,941

(22) PCT Filed: Dec. 6, 2016

(86) PCT No.: PCT/EP2016/079817
§ 371 (c)(1),
(2) Date: Jun. 6, 2018

(87) PCT Pub. No.: WO2017/097729
PCT Pub. Date: Jun. 15, 2017

(65) Prior Publication Data
US 2018/0273674 A1    Sep. 27, 2018

(30) Foreign Application Priority Data

Dec. 9, 2015  (EP) .................................... 15198734
Nov. 11, 2016  (EP) .................................... 16198306

(51) Int. Cl.
*C08G 18/16*    (2006.01)
*C08G 18/18*    (2006.01)
(Continued)

(52) U.S. Cl.
CPC ............. *C08G 18/44* (2013.01); *C08G 18/16* (2013.01); *C08G 18/18* (2013.01); *C08G 18/24* (2013.01); *C08G 18/244* (2013.01); *C08G 18/40* (2013.01); *C08G 18/48* (2013.01); *C08G 18/76* (2013.01); *C08G 18/7621* (2013.01); *C08G 64/183* (2013.01); *C08G 64/34* (2013.01); *C08G 65/26* (2013.01); *C08J 9/0023* (2013.01);
(Continued)

(58) Field of Classification Search
CPC ...... C08G 18/18; C08G 18/24; C08G 18/244; C08G 18/44; C08G 18/48; C08G 18/7621; C08G 2101/0008; C08J 9/0023; C08J 9/0033; C08J 9/0038
See application file for complete search history.

(56) References Cited

U.S. PATENT DOCUMENTS 3,404,109 A    10/1968  Milgrom
3,829,505 A    8/1974   Herold
(Continued)

FOREIGN PATENT DOCUMENTS

DE   3103757 A1   12/1981
EP   3176013 A2    4/1986
(Continued)

OTHER PUBLICATIONS

Inoue et al., Copolymerization of Carbon Dioxide and Epoxide with Organometallic Compounds; Die Makromolekulare Chemie 130, 210-220, 1969.
(Continued)

*Primary Examiner* — Melissa A Rioja
(74) *Attorney, Agent, or Firm* — Donald R. Palladino; N. Denise Brown

(57) ABSTRACT

The present invention relates to a method for producing polyurethane foams by reacting an isocyanate component with an isocyanate-reactive component comprising at least one polyethercarbonate polyol, the reaction taking place in the presence of a component K selected from one or more compounds from the group consisting of K1 esters of mono- or polybasic carboxylic acids whose (first) dissociation has a pKa of 0.5 to 4.0, K2 mono-, di- and polysulfonates of mono- and polyfunctional alcohols, and K3 one or more compounds from the group consisting of K 3.1 esters of phosphoric acid, phosphonic acid, phosphorous acid, phosphinic acid, phosphonous acid and phosphinous acid, these esters each containing no P—OH group, K3.2 oligomeric alkyl phosphates of the general formula (II), where a is an integer from 1 to 10, b is an integer from 1 to 10, R1, R2, R3 and R4 are alkyl groups having at least one carbon, and R1, R2, R3 and R4 are alike or, independently of one another, different, and R5 is a linear alkylene group having at least two carbons or is a branched alkylene group having at least three carbons, and K3.3 comprises oligomeric alkyl phosphates of the general formula (III), where a is an integer from 1 to 10, b is an integer from 1 to 10, R1, R4 and R5 are linear alkylene groups having at least two carbons or are branched alkylene groups having at least three carbons, and R1, R4 and R5 are alike or, independently of one another, different, and R2 and R3 are alkyl groups having at least one carbon, and R2 and R3 are alike or, independently of one another, different. The invention also relates to polyurethane foams produced by the method of the invention and to the use thereof.

16 Claims, No Drawings

(51) Int. Cl.
   *C08G 18/24* (2006.01)
   *C08G 18/40* (2006.01)
   *C08G 18/44* (2006.01)
   *C08G 18/48* (2006.01)
   *C08G 18/76* (2006.01)
   *C08G 64/18* (2006.01)
   *C08G 64/34* (2006.01)
   *C08G 65/26* (2006.01)
   *C08J 9/00* (2006.01)
   *C08J 9/12* (2006.01)

(52) U.S. Cl.
   CPC ......... *C08J 9/0033* (2013.01); *C08J 9/0038* (2013.01); *C08J 9/125* (2013.01); *C08G 2110/005* (2021.01); *C08G 2110/0008* (2021.01); *C08J 2203/10* (2013.01); *C08J 2205/06* (2013.01); *C08J 2375/04* (2013.01)

(56) References Cited

U.S. PATENT DOCUMENTS

| | | | |
|---|---|---|---|
| 3,941,849 A | 3/1976 | Herold | |
| 4,089,835 A | 5/1978 | König et al. | |
| 4,248,930 A | 2/1981 | Haas et al. | |
| 4,260,530 A | 4/1981 | Reischl et al. | |
| 4,374,209 A | 2/1983 | Rowlands | |
| 4,713,399 A * | 12/1987 | Webb | C08G 18/44 252/182.24 |
| 4,826,953 A | 5/1989 | Kuyper et al. | |
| 5,158,922 A | 10/1992 | Hinney et al. | |
| 5,173,518 A * | 12/1992 | Bott | C08G 18/10 521/172 |
| 5,470,813 A | 11/1995 | Le-Khac | |
| 5,536,883 A | 7/1996 | Le-Khac | |
| 5,637,673 A | 6/1997 | Le-Khac | |
| 5,714,428 A | 2/1998 | Le-Khac | |
| 5,736,588 A * | 4/1998 | Eisen | C08J 9/0023 521/155 |
| 5,789,626 A | 8/1998 | Le-Khac | |
| 6,018,017 A | 1/2000 | Le-Khac | |
| 6,767,986 B2 | 7/2004 | Moethrath et al. | |
| 7,008,900 B1 | 3/2006 | Hofmann et al. | |
| 8,134,022 B2 | 3/2012 | Haider et al. | |
| 8,324,419 B2 | 12/2012 | Mijolovic et al. | |
| 9,815,965 B2 * | 11/2017 | Laemmerhold | C08G 64/0258 |
| 10,106,641 B2 * | 10/2018 | Klesczewski | C08G 18/4866 |
| 2003/0083393 A1 * | 5/2003 | Kiso | C08G 18/5024 521/131 |
| 2009/0306239 A1 | 12/2009 | Mijolovic et al. | |
| 2013/0296450 A1 * | 11/2013 | Hofmann | C08G 64/183 521/157 |
| 2014/0066535 A1 * | 3/2014 | Jacobs | C08G 18/12 521/159 |
| 2014/0107245 A1 * | 4/2014 | Hofmann | C08G 64/183 521/172 |
| 2016/0208080 A1 | 7/2016 | Laemmerhold et al. | |
| 2016/0257776 A1 | 9/2016 | Jacobs et al. | |
| 2017/0044341 A1 | 2/2017 | Klesczewski et al. | |
| 2018/0044464 A1 * | 2/2018 | Klesczewski | C08G 18/7621 |
| 2018/0079890 A1 * | 3/2018 | Laemmerhold | C08G 64/0258 |
| 2018/0327537 A1 * | 11/2018 | Gossner | C08G 18/7621 |

FOREIGN PATENT DOCUMENTS

| | | |
|---|---|---|
| EP | 0355000 A1 | 2/1990 |
| GB | 2072204 A | 9/1981 |

OTHER PUBLICATIONS

Kunststoff-Handbuch, vol. VII, edited by G. Oertel, Carl-Hanser-Verlag, Munich, 3rd edition, 1993, eg. on pp. 104-127.

W. Siefken in Justus Liebigs Annalen der Chemie, 562, pp. 75 to 136.

Oertel, Gunter; Polyurethane Handbook, 2nd Edition; Hanser Publishing, NY (1993); pp. 129-245; believed to correspond to Kunststoff Handbuch; vol. VII, pp. 139-265, edited by Vieweg and Hochtlen, Carl-Hanser-Verlag, Munich, (1993).

* cited by examiner

POLYURETHANE FOAMS BASED ON POLYETHERCARBONATE POLYOLS

CROSS-REFERENCE TO RELATED APPLICATIONS

This application is a national stage application under 35 U.S.C. § 371 of PCT/EP2016/079817, filed Dec. 6, 2016, which claims the benefit of European Application No. 15198734.4, filed Dec. 9, 2015 and European Application No. 16198306.9, filed Nov. 11, 2016, all of which are being incorporated by reference herein.

FIELD

The present invention relates to a process for producing polyurethane foams, preferably flexible polyurethane foams, by reaction of an isocyanate component with a component which is reactive toward isocyanates and comprises at least one polyether carbonate polyol, with the reaction taking place in the presence of a component K which will be described in more detail below. The invention further relates to polyurethane foams produced by the process according to the invention and to the use thereof.

BACKGROUND

In the context of an environmentally friendly configuration of production processes, it is generally desirable to use $CO_2$-based starting materials, for example in the form of polyether carbonate polyols, in relatively large amounts. The preparation of polyether carbonate polyols by catalytic reaction of alkylene oxides (epoxides) and carbon dioxide in the presence of H-functional starter compounds ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown schematically in the scheme (I), where R is an organic radical such as alkyl, alkylaryl or aryl, which in each case can also contain heteroatoms such as O, S, Si, etc., and e, f and g are each an integer; the polyether carbonate polyol product shown here in scheme (I) should be interpreted merely as meaning that blocks having the structure shown can in principle recur in the polyether carbonate polyol obtained, with the order, number and length of the blocks and also the OH functionality of this starter being able to vary and not being restricted to the polyether carbonate polyol shown in scheme (I). This reaction (see scheme (I)) is ecologically very advantageous since this reaction represents the reaction of a greenhouse gas such as $CO_2$ into a polymer. A further product formed, actually a by-product, is the cyclic carbonate shown in scheme (I) (for example propylene carbonate when R=$CH_3$, also referred to hereinafter as cPC, or ethylene carbonate when R=H, also referred to hereinafter as cEC).

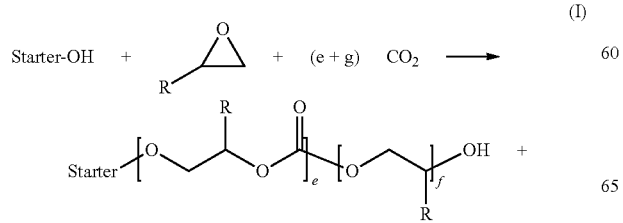

(I)

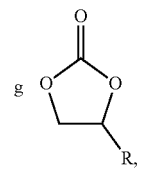

The production of polyurethane foams based on polyether carbonate polyols and isocyanates is known (e.g. WO 2012/130760 A1, EP-A 0 222 453). It has been found that when polyether carbonate polyols are used for producing polyurethane foams, the resulting products contain cyclic propylene carbonate which can be detected, for example, by emission measurements on the flexible polyurethane foam.

SUMMARY

It is therefore an object of the present invention to provide a process for producing polyurethane foams which leads to polyurethane foams having a reduced emission of cyclic propylene carbonate.

This object has surprisingly been achieved by a process for producing polyurethane foams, preferably flexible polyurethane foams, by reaction of component A containing polyether carbonate polyol having a hydroxyl number in accordance with DIN 53240 of from ≥20 mg KOH/g to ≤120 mg KOH/g (component A1), B optionally
  B1) catalysts and/or
  B2) auxiliaries and additives C water and/or physical blowing agents With D diisocyanates and/or polyisocyanates, where the production reaction is carried out at an index of from ≥90 to ≤120, characterized in that the production reaction is carried out in the presence of a component K, where component K is selected from among one or more compounds from the group consisting of K1 esters of monobasic or polybasic carboxylic acids whose (first) dissociation has a pKa of from 0.5 to 4.0, K2 monosulfonates, disulfonates and polysulfonates of monofunctional and polyfunctional alcohols and K3 one or more compounds selected from the group consisting of K 3.1 esters of phosphoric acid, phosphonic acid, phosphorous acid, phosphinic acid, phosphonous acid and phosphinous acid, where these esters in each case do not contain a P—OH group, K3.2 oligomeric alkyl phosphates of the general formula (II),

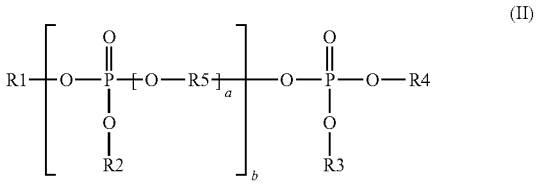

(II)

where
a is an integer from 1 to 10,
b is an integer from 1 to 10,

R1, R2, R3, R4 are alkyl groups having at least one carbon atom, preferably C1-C6-alkyl, where R1, R2, R3, R4 are identical or independently different from one another, and R5 is a linear alkylene group having at least two carbon atoms or a branched alkylene group having at least three carbon atoms, preferably a linear alkylene group having from 2 to 10 carbon atoms or a branched alkylene group having from 3 to 10 carbon atoms, and K3.3 oligomeric alkyl phosphates of the general formula (III),

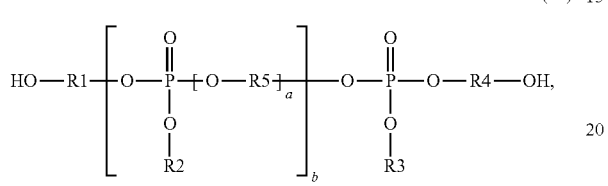

(III)

where
a is an integer from 1 to 10,
b is an integer from 1 to 10,
R1, R4, R5 are linear alkylene groups having at least two carbon atoms or branched alkylene groups having at least three carbon atoms, preferably linear alkylene groups having from two to ten carbon atoms or branched alkylene groups having from three to ten carbon atoms, where R1, R4, R5 are identical or independently different from one another, R2, R3 are alkyl groups having at least one carbon atom, preferably C1-C6-alkyl, where R2 and R3 are identical or independently different from one another, and component K is preferably used in an amount of from ≥1.0 to ≤5.0 parts by weight, particularly preferably from ≥2.0 to ≤5.0 parts by weight, where all parts by weight figures for the component K are based on the sum of the parts by weight of the components A1+A2=100 parts by weight.

DETAILED DESCRIPTION

The invention preferably provides a process for producing polyurethane foams, preferably flexible polyurethane foams, by reaction of A1 from ≥40 to ≤100 parts by weight, preferably from ≥60 to ≤100 parts by weight, particularly preferably from ≥80 to ≤100 parts by weight, of one or more polyether carbonate polyols having a hydroxyl number in accordance with DIN 53240 of from ≥20 mg KOH/g to ≤120 mg KOH/g, A2 from ≤60 to ≥0 parts by weight, preferably from ≤40 to ≥0 parts by weight, particularly preferably from ≤20 to ≥0 parts by weight, of one or more polyether polyols having a hydroxyl number in accordance with DIN 53240 of from ≥20 mg KOH/g to ≤250 mg KOH/g and a content of ethylene oxide of from ≥0 to ≤60% by weight, where the polyether polyols A2 are free of carbonate units, A3 from ≤20 to ≥0 parts by weight, based on the sum of the parts by weight of the components A1 and A2, of one or more polyether polyol having a hydroxyl number in accordance with DIN 53240 of from ≥20 mg KOH/g to ≤250 mg KOH/g and a content of ethylene oxide of >60% by weight, where the polyether polyols A3 are free of carbonate units, A4 from ≤40 to ≥0 parts by weight, based on the sum of the parts by weight of the components A1 and A2, of one or more polymer polyols, PUD polyols and/or PIPA polyols, A5 from ≤40 to ≥0 parts by weight, based on the sum of the parts by weight of the components A1 and A2, of polyols which do not come under the definition of the components A1 to A4.

B optionally
B1) catalysts and/or
B2) auxiliaries and additives
C water and/or physical blowing agents,
with
D diisocyanates and/or polyisocyanates,
where the production is carried out at an index of from ≥90 to ≤120, where all percent by weight figures for the components A1, A2, A3, A4, A5 are normalized in such a way that the sum of the parts by weight of A1+A2 in the composition is 100, characterized in that the production takes place in the presence of component K.

The components A1 to A5 in each case relate to "one or more" of the compounds mentioned. When a plurality of compounds of one component are used, the amount indicated corresponds to the sum of the parts by weight of the compounds.

In a particularly preferred embodiment, component A contains

A1 from ≥65 to ≤75 parts by weight, most preferably from ≥68 to ≤72 parts by weight of one or more Gew.-Teile eines oder mehrerer polyether carbonatepolyols having a hydroxyl number according to DIN 53240 of from ≥20 mg KOH/g to ≤120 mg KOH/g and preferably a $CO_2$ content of from 15 to 25% by weight, and A2 from ≤35 to ≥25 parts by weight, most preferably from ≤32 to ≥28 parts by weight, of one or more polyether polyols having a hydroxyl number in accordance with DIN 53240 of from ≥20 mg KOH/g to ≤250 mg KOH/g and a content of ethylene oxide of from ≥0 to ≤60% by weight, where the polyether polyols A2 are free of carbonate units, where the component A is preferably free of components A3 and/or A4.

In another embodiment, component A comprises

A1 from ≥65 to ≤75 parts by weight, preferably from ≥68 to ≤72 parts by weight, of one or more polyether carbonate polyols having a hydroxyl number in accordance with DIN 53240 of from ≥20 mg KOH/g to ≤120 mg KOH/g and preferably a $CO_2$ content of from 15 to 25% by weight, and A2 from ≤35 to ≥25 parts by weight, preferably from ≤32 to ≥28 parts by weight, of one or more polyether polyols having a hydroxyl number in accordance with DIN 53240 of from ≥20 mg KOH/g to ≤250 mg KOH/g and a content of ethylene oxide of from ≥0 to ≤60% by weight, where the polyether polyols A2 are free of carbonate units, A3 from ≤20 to ≥2 parts by weight, preferably from ≤10 to ≥2 parts by weight, based on the sum of the parts by weight of the components A1 and A2, of one or more polyether polyols having a hydroxyl number in accordance with DIN 53240 of from ≥20 mg KOH/g to ≤250 mg KOH/g and a content of ethylene oxide of ≥60% by weight, where the polyether polyols A3 are free of carbonate units,
where the component A is preferably free of component A4.

In a further embodiment, component A comprises

A1 from ≥40 to ≤100 parts by weight, preferably from ≥60 to ≤100 parts by weight, particularly preferably from ≥80 to ≤100 parts by weight, most preferably from ≥65 to ≤75 parts by weight, of one or more polyether carbonate polyols having a hydroxyl number in accordance with DIN 53240 of from ≥20 mg KOH/g to ≤120 mg KOH/g and preferably a $CO_2$ content of from 15 to 25% by weight, and A2 from ≤60 to ≥0 parts by weight, preferably from ≤40 to ≥0 parts by weight, particularly preferably from ≤20 to ≥0 parts by weight, most preferably from ≤35 to ≥25 parts by weight, of one or more polyether polyols having a hydroxyl number in accordance with DIN 53240 of from ≥20 mg KOH/g to ≤250 mg KOH/g and a content of ethylene oxide of from ≥0 to ≤60% by weight, where the polyether polyols A2 are free of carbonate units, A4 from ≤40 to ≥0.01 parts by weight, preferably from ≤20 to ≥0.01 parts by weight, particularly preferably from ≤20 to ≥1 parts by weight, most preferably from ≤20 to ≥2 parts by weight, based on the sum of the parts by weight of the components A1 and A2, of one or more polymer polyols, PUD polyols and/or PIPA polyols, A5 from ≤40 to ≥0 parts by weight, based on the sum of the parts by weight of the components A1 and A2, of polyols which do not come under the definition of the components A1 to A4, where the component A is preferably free of component A3.

Here, the stated ranges and ranges of preference of components A1, A2, A4, and A5 are freely combined with one another.

In the following, the components used in the process of the invention are described in more detail.

Component A1

The component A1 comprises a polyether carbonate polyol which has a hydroxyl number (OH number) in accordance with DIN 53240 of from ≥20 mg KOH/g to ≤120 mg KOH/g, preferably from ≥20 mg KOH/g to ≤100 mg KOH/g, particularly preferably from ≥25 mg KOH/g to ≤90 mg KOH/g, and is obtained by copolymerization of carbon dioxide and one or more alkylene oxides in the presence of one or more H-functional starter molecules, where the polyether carbonate polyol preferably has a $CO_2$ content of from 15 to 25% by weight. Component A1 preferably comprises a polyether carbonate polyol which is obtainable by copolymerization of from ≥2% by weight to ≤30% by weight of carbon dioxide and from ≥70% by weight to ≤98% by weight of one or more alkylene oxides in the presence of one or more H-functional starter molecules having an average functionality of from ≥1 to ≤6, preferably from ≥1 to ≤4, particularly preferably from ≥2 to ≤3. For the purposes of the invention, the expression "H-functional" refers to a starter compound which has H atoms which are reactive in respect of alkoxylation.

The copolymerization of carbon dioxide and one or more alkylene oxides is preferably effected in the presence of at least one DMC catalyst (double metal cyanide catalyst).

The polyether carbonate polyols used in accordance with the invention preferably also have ether groups between the carbonate groups, shown schematically in formula (IV). In the scheme according to formula (IV), R is an organic radical such as alkyl, alkylaryl or aryl which can in each case also contain heteroatoms such as O, S, Si, etc.; e and f are each an integer. The polyether carbonate polyol shown in the scheme according to formula (IV) should be considered to mean merely that blocks having the structure shown can in principle be present in the polyether carbonate polyol but the order, number and length of the blocks can vary and are not restricted to the polyether carbonate polyol shown in formula (IV). In the case of formula (IV), this means that the ratio of e/f is preferably from 2:1 to 1:20, particularly preferably from 1.5:1 to 1:10.

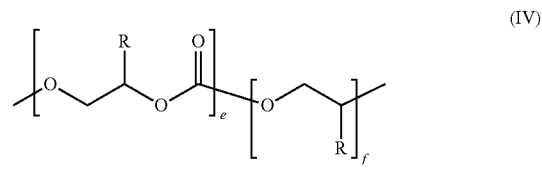

(IV)

The proportion of incorporated $CO_2$ ("units derived from carbon dioxide"; "$CO_2$ content") in a polyether carbonate polyol can be determined from the evaluation of characteristic signals in the $^1H$ NMR spectrum. The following example illustrates the determination of the proportion of units derived from carbon dioxide in a 1,8-octanediol-initiated $CO_2$/propylene oxide polyether carbonate polyol.

The proportion of incorporated $CO_2$ in a polyether carbonate polyol and the ratio of propylene carbonate to polyether carbonate polyol can be determined by means of $^1H$ NMR (a suitable instrument is the DPX 400 instrument from Bruker, 400 MHz; pulse program zg30, delay time d1: 10 s, 64 scans). Each sample is dissolved in deuterated chloroform. The relevant resonances in the $^1H$ NMR (based on TMS=0 ppm) are as follows:

Cyclic carbonate (which was formed as a by-product) having a resonance at 4.5 ppm; carbonate resulting from carbon dioxide incorporated in the polyether carbonate polyol having resonances at 5.1 to 4.8 ppm; unreacted propylene oxide (PO) having a resonance at 2.4 ppm; polyether polyol (i.e. without incorporated carbon dioxide) having resonances at 1.2 to 1.0 ppm; the octane-1,8-diol incorporated as starter molecule (if present) having a resonance at 1.6 to 1.52 ppm.

The proportion by weight (in % by weight) of polymer-bonded carbonate (LC') in the reaction mixture was calculated according to formula (V), $$LC' = \frac{[F(5.1-4.8) - F(4.5)] * 102}{N} * 100\% \qquad (V)$$

where the value of N ("denominator" N) is calculated according to formula (VI):

$$N=[F(5.1-4.8)-F(4.5)]*102+F(4.5)*102+F(2.4)*58+ 0.33*F(1.2-1.0)*58\pm0.25*F(1.6-1.52)*146 \qquad (VI)$$

The following abbreviations apply here:

F(4.5)=area of the resonance at 4.5 ppm for cyclic carbonate (corresponds to one H atom)

F(5.1-4.8)=area of the resonance at 5.1-4.8 ppm for polyether carbonate polyol and one H atom for cyclic carbonate.

F(2.4)=area of the resonance at 2.4 ppm for free, unreacted PO

F(1.2-1.0)=area of the resonance at 1.2-1.0 ppm for polyether polyol

F(1.6-1.52)=area of the resonance at from 1.6 to 1.52 ppm for 1,8-octanediol (starter), if present.

The factor of 102 results from the sum of the molar masses of $CO_2$ (molar mass 44 g/mol) and of propylene oxide (molar mass 58 g/mol), the factor of 58 results from the molar mass of propylene oxide, and the factor of 146 results from the molar mass of the octane-1,8-diol starter used (if present).

The proportion by weight (in % by weight) of cyclic carbonate (CC') in the reaction mixture was calculated according to formula (VII), $$CC' = \frac{F(4.5) * 102}{N} * 100\% \qquad (VII)$$

where the value of N is calculated according to formula (VI).

In order to calculate the composition based on the polymer component (consisting of polyether polyol built up from starter and propylene oxide during the activation steps taking place under $CO_2$-free conditions, and polyether carbonate polyol built up from starter, propylene oxide and carbon dioxide during the activation steps taking place in the presence of $CO_2$ and during the copolymerization) from the values for the composition, the nonpolymeric constituents of the reaction mixture (i.e. cyclic propylene carbonate and any unreacted propylene oxide present) were eliminated mathematically. The proportion by weight of the carbonate repeating units in the polyether carbonate polyol was converted into a proportion by weight of carbon dioxide by means of the factor F=44/(44+58). The indicated $CO_2$ content in the polyether carbonate polyol is normalized relative to the proportion of the polyether carbonate polyol molecule formed in the copolymerization and any activation steps in the presence of $CO_2$ (i.e. the proportion of the polyether carbonate polyol molecule resulting from the starter (1,8-octanediol, if present) and from the reaction of the starter with epoxide added under $CO_2$-free conditions was disregarded here).

For example, the preparation of polyether carbonate polyols according to A1 comprises:

(α) initially charging an H-functional starter compound or a mixture of at least two H-functional starter compounds and optionally removing water and/or other volatile compounds by means of elevated temperature and/or reduced pressure ("drying"), with the DMC catalyst being added to the H-functional starter compound or the mixture of at least two H-functional starter compounds before or after drying, (β) adding a partial amount (based on the total amount of the amount of alkylene oxides used in the activation and copolymerization) of one or more alkylene oxides to the mixture resulting from step (α) to effect the activation, with this addition of a partial amount of alkylene oxide optionally being able to be carried out in the presence of $CO_2$ and the hot spots occurring as a result of the subsequent exothermic chemical reaction and/or a pressure drop in the reactor then being awaited and the activation step (β) also being able to be carried out a number of times, (γ) adding one or more of the alkylene oxides and carbon dioxide to the mixture resulting from step (β), with the alkylene oxides used in step (β) being able to be identical to or different from the alkylene oxides used in step (γ).

In general, alkylene oxides (epoxides) having 2 to 24 carbon atoms can be used for preparing the polyether carbonate polyols A1. The alkylene oxides having from 2 to 24 carbon atoms are for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, monoepoxidized or polyepoxidized fats as monoglycerides, diglycerides and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preference is given to using ethylene oxide and/or propylene oxide and/or 1,2-butylene oxide, particularly preferably propylene oxide, as alkylene oxides.

In a preferred embodiment of the invention, the proportion of ethylene oxide in the total amount of propylene oxide and ethylene oxide used is from ≥0 to ≤90% by weight, preferably from ≥0 to ≤50% by weight, and is particularly preferably free of ethylene oxide.

As suitable H-functional starter compounds, it is possible to use compounds having H atoms which are active in respect of alkoxylation. Groups having active H atoms which are active in respect of the alkoxylation are, for example, —OH, —$NH_2$ (primary amines), —NH— (secondary amines), —SH, and —$CO_2H$, with preference being given to —OH and —$NH_2$, and particular preference being given to —OH. As H-functional starter compounds, use is made of, for example, one or more compounds selected from the group consisting of water, mono- or polyhydric alcohols, polyfunctional amines, polyhydric thiols, amino alcohols, thiol alcohols, hydroxy esters, polyether polyols, polyester polyols, polyester ether polyols, polyether carbonate polyols, polycarbonate polyols, polycarbonates, polyethyleneimines, polyetheramines (e.g. Jeffamines® from Huntsman, e.g. D-230, D-400, D 2000, T-403, T-3000, T-5000, or corresponding products from BASF, e.g. polyetheramine D230, D400, D200, T403, T5000), polytetrahydrofurans (e.g. PolyTHF® from BASF, e.g. PolyTHF® 250, 650S, 1000, 1000S, 1400, 1800, 2000), polytetrahydrofuranamines (BASF product polytetrahydrofuranamine 1700), polyether thiols, polyacrylate polyols, castor oil, the monoglyceride or diglyceride of ricinoleic acid, monoglycerides of fatty acids, chemically modified monoglycerides, diglycerides and/or triglycerides of fatty acids, and $C_1$-$C_{24}$-alkyl fatty acid esters containing an average of at least 2 OH groups per molecule. By way of example, the $C_1$-$C_{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol® TM products (from USSC Co.).

As monofunctional starter compounds, it is possible to use alcohols, amines, thiols and carboxylic acids. As monofunctional alcohols, it is possible to use: methanol, ethanol, 1-propanol, 2-propanol, 1-butanol, 2-butanol, t-butanol, 3-buten-1-ol, 3-butyn-1-ol, 2-methyl-3-buten-2-ol, 2-methyl-3-butyn-2-ol, propargyl alcohol, 2-methyl-2-propanol, 1-t-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, t-butylamine, pentylamine, hexylamine, aniline, aziridine, pyrrolidine, piperidine, morpholine. As monofunctional thiols, it is possible to use: ethanethiol, 1-propanethiol, 2-propanethiol, 1-butanethiol, 3-methyl-1-butanethiol, 2-butene-1-thiol, thiophenol. As monofunctional carboxylic acids, mention may be made of: formic acid, acetic acid, propionic acid, butyric acid, fatty acids such as stearic acid, palmitic acid, oleic acid, linoleic acid, linolenic acid, benzoic acid, acrylic acid.

Polyhydric alcohols which are suitable as H-functional starter compounds are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentantanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol, and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolyzates, cellulose, cellulose hydrolyzates, hydroxy-functionalized fats and oils, especially castor oil), and also all products of modification of these aforementioned alcohols with different amounts of ε-caprolactone. In mixtures of H-functional starters, it is also possible to use trihydric alcohols, for example trimethylolpropane, glycerol, trishydroxyethyl isocyanurate and castor oil.

The H-functional starter compounds can also be selected from the class of polyether polyol, in particular those having a molecular weight $M_n$ in the range from 100 to 4000 g/mol, preferably from 250 to 2000 g/mol. Preference is given to polyether polyols which are made up of repeating ethylene oxide and propylene oxide units, preferably with a proportion of from 35 to 100% of propylene oxide units, particularly preferably with a proportion of from 50 to 100% of propylene oxide units. These may be random copolymers, gradient copolymers, alternating copolymers or block copolymers of ethylene oxide and propylene oxide. Suitable polyether polyols made up of repeating propylene oxide and/or ethylene oxide units are for example, the Desmophen®, Acclaim®, Arcol®, Baycoll®, Bayfill®, Bayflex®, Baygal®, PET® and polyether polyols from Covestro Deutschland AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter compounds can also be selected from the class of polyester polyols, in particular those having a molecular weight $M_n$ in the range from 200 to 4500 g/mol, preferably from 400 to 2500 g/mol. At least bifunctional polyesters are used as polyester polyols. Polyester polyols preferably consist of alternating acid and alcohol units. Acid components employed are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. Using dihydric or polyhydric polyether polyols as alcohol components gives polyester ether polyols which can likewise serve as starter compounds for preparing the polyether carbonate polyols. If polyether polyols are used for preparing the polyester ether polyols, polyether polyols having a number average molecular weight $M_n$ of from 150 to 2000 g/mol are preferred.

Furthermore, polycarbonate polyols (for example polycarbonate diols) in particular those having a molecular weight $M_n$ in the range from 150 to 4500 g/mol, preferably from 500 to 2500, as are prepared, for example, by reaction of phosgene, dimethyl carbonate, diethyl carbonate or diphenyl carbonate and bifunctional and/or polyfunctional alcohols or polyester polyols or polyether polyols, can be used as H-functional starter compounds. Examples of polycarbonate polyols may be found in EP-A 1359177 for example. For example, the Desmophen® C grades from Covestro Deutschland AG, e.g. Desmophen® C 1100 or Desmophen® C 2200, can be used as polycarbonate diols.

It is likewise possible to use polyether carbonate polyols as H-functional starter compounds. In particular, polyether carbonate polyols prepared by the above-described process are used. These polyether carbonate polyols used as H-functional starter compounds are for this purpose prepared beforehand in a separate reaction step.

Preferred H-functional starter compounds are alcohols of the general formula (VIII), $$HO-(CH_2)_x-OH \quad \quad (VIII)$$

where x is from 1 to 20, preferably an even number from 2 to 20. Examples of alcohols of the formula (VIII) are ethylene glycol, 1,4-butanediol, 1,6-hexanediol, 1,8-octanediol, 1,10-decanediol and 1,12-dodecanediol. Further preferred H-functional starter compounds are neopentyl glycol, trimethylolpropane, glycerol, pentaerythritol, reaction products of the alcohols of formula (IV) with ε-caprolactone, for example reaction products of trimethylolpropane with ε-caprolactone, reaction products of glycerol with ε-caprolactone and reaction products of pentaerythritol with ε-caprolactone. Preference is also given to using water, diethylene glycol, dipropylene glycol, castor oil, sorbitol and polyether polyols made up of repeating polyalkylene oxide units as H-functional starter compounds.

The H-functional starter compounds are particularly preferably one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, bifunctional and trifunctional polyether polyols, where the polyether polyol is formed from a bi- or tri-H-functional starter substance and propylene oxide or a bi- or tri-H-functional starter substance, propylene oxide and ethylene oxide. The polyether polyols preferably have a number-average molecular weight $M_n$ in the range from 62 to 4500 g/mol and in particular a number average molecular weight $M_n$ in the range from 62 to 3000 g/mol, very particularly preferably a molecular weight of from 62 to 1500 g/mol. The polyether polyols preferably have a functionality of from ≥2 to ≤3.

In a preferred embodiment of the invention, the polyether carbonate polyol A1 is obtainable by addition of carbon dioxide and alkylene oxides onto H-functional starter compounds using multi-metal cyanide catalysts (DMC catalysts). The preparation of polyether carbonate polyols by addition of alkylene oxides and $CO_2$ onto H-functional starter compounds using DMC catalysts is known, for example, from EP-A 0222453, WO-A 2008/013731 and EP-A 2115032.

DMC catalysts are known in principle from the prior art for homopolymerization of epoxides (see, for example, U.S. Pat. Nos. 3,404,109, 3,829,505, 3,941,849 and 5,158,922). DMC catalysts which are described, for example, in U.S. Pat. No. 5,470,813, EP-A 700 949, EP-A 743 093, EP-A 761 708, WO-A97/40086, WO-A98/16310 and WO-A00/47649 have a very high activity in the homopolymerization of epoxides and make it possible to prepare polyether polyols and/or polyether carbonate polyols at very low catalyst concentrations (25 ppm or less). A typical example is the highly active DMC catalysts described in EP-A 700 949 which in addition to a double metal cyanide compound (e.g., zinc hexacyanocobaltate (III)) and an organic complexing ligand (e.g., t-butanol) contain a polyether having a number-average molecular weight $M_n$ of greater than 500 g/mol.

The DMC catalyst is usually employed in an amount of ≤1 wt %, preferably in an amount of ≤0.5 wt %, particularly preferably in an amount of ≤500 ppm and in particular in an amount of ≤300 ppm, in each case based on the weight of the polyether carbonate polyol.

In a preferred embodiment of the invention, the polyether carbonate polyol A1 has a content of carbonate groups ("units derived from carbon dioxide"), calculated as $CO_2$, of from ≥2.0 to ≤30.0% by weight, preferably from ≥5.0 to ≤28.0% by weight and particularly preferably from ≥10.0 to ≤25.0% by weight.

In a further embodiment of the process of the invention, the polyether carbonate polyol(s) A1 has/have a hydroxyl number of from ≥20 mg KOH/g to ≤250 mg KOH/g and is/are obtainable by copolymerization of from ≥2.0% by weight to ≤30.0% by weight of carbon dioxide and from ≥70% by weight to ≤98% by weight of propylene oxide in the presence of a hydroxy-functional starter molecule, for example trimethylolpropane and/or glycerol and/or propylene glycol and/or sorbitol. The hydroxyl number can be determined in accordance with DIN 53240.

In a further embodiment, use is made of a polyether carbonate polyol A1 containing blocks of the formula (IV), where the ratio e/f is from 2:1 to 1:20.

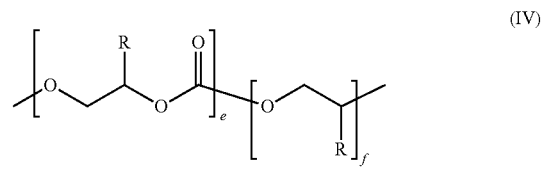

(IV)

In a further embodiment of the invention, component A1 is used in an amount of 100 parts by weight.

Component A2

The component A2 comprises polyether polyols having a hydroxyl number in accordance with DIN 53240 of from ≥20 mg KOH/g to ≤250 mg KOH/g, preferably from ≥20 to ≤112 mg KOH/g and particularly preferably from ≥20 mg KOH/g to ≤80 mg KOH/g, and is free of carbonate units. The preparation of the compounds A2 can be carried out by catalytic addition of one or more alkylene oxides onto H-functional starter compounds.

As alkylene oxides (epoxides), it is possible to use alkylene oxides having from 2 to 24 carbon atoms. The alkylene oxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, monoepoxidized or polyepoxidized fats as monoglycerides, diglycerides and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxy silane, 3-glycidyloxypropyltriisopropoxysilane. Preference is given to using ethylene oxide and/or propylene oxide and/or 1,2-butylene oxide as alkylene oxides. Particular preference is given to using an excess of propylene oxide and/or 1,2-butylene oxide. The alkylene oxides can be introduced individually, in a mixture or in succession into the reaction mixture. The copolymers may be random or block copolymers. If the alkylene oxides are metered in successively, the products (polyether polyols) produced contain polyether chains having block structures.

The H-functional starter compounds have functionalities of from ≥2 to ≤6 and are preferably hydroxy-functional (OH-functional). Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. It is also possible to use these as mixtures.

Preference is given to using 1,2-propylene glycol and/or glycerol and/or trimethylolpropane and/or sorbitol as starter compound.

The polyether polyols A2 have a content of from ≥0 to ≤60% by weight, preferably from ≥0 to ≤40% by weight, particularly preferably from ≥0 to ≤25% by weight of ethylene oxide.

Component A3

The component A3 comprises polyether polyols having a hydroxyl number in accordance with DIN 53240 of from ≥20 mg KOH/g to ≤250 mg KOH/g, preferably from ≥20 to ≤112 mg KOH/g and particularly preferably from ≥20 mg KOH/g to ≤80 mg KOH/g.

The preparation of the component A3 is in principle carried out in a manner analogous to that of the component A2, but with a content of ethylene oxide in the polyether polyol of ≥60% by weight, preferably ≥65% by weight, being set.

Possible alkylene oxides and H-functional starter compounds are the same as those described for component A2.

However, preference is given to H-functional starter compounds which have a functionality of from ≥3 to ≤6, particularly preferably 3, so that polyether triols are formed. Preferred starter compounds having a functionality of 3 are glycerol and/or trimethylolpropane, with particular preference being given to glycerol.

In a preferred embodiment, the component A3 is a glycerol-initiated trifunctional polyether having an ethylene oxide content of from 68 to 73% by weight and an OH number of from 35 to 40 mg KOH/g.

Component A4

The component A4 comprises polymer polyols, PUD polyols and PIPA polyols.

Polymer polyols are polyols which contain proportions of solid polymers produced by free-radical polymerization of suitable monomers such as styrene or acrylonitrile in a base polyol, e.g. a polyether polyol and/or polyether carbonate polyol.

PUD (polyureadispersion) polyols are, for example, prepared by in-situ polymerization of an isocyanate or an isocyanate mixture with a diamine and/or hydrazine in a polyol, preferably a polyether polyol. The polyurea dispersion is preferably prepared by reaction of an isocyanate mixture composed of from 75 to 85% by weight of tolylene 2,4-diisocyanate (2,4-TDI) and from 15 to 25% by weight of tolylene 2,6-diisocyanate (2,6-TDI) with a diamine and/or hydrazine in a polyether polyol, preferably a polyether polyol and/or polyether carbonate polyol prepared by alkoxylation of a trifunctional starter (for example glycerol and/or trimethylolpropane), in the case of the polyether carbonate polyol in the presence of carbon dioxide. Processes for preparing polyuria dispersions are described, for example, in U.S. Pat. Nos. 4,089,835 and 4,260,530.

The PIPA polyols are polyether polyols and/or polyether carbonate polyols modified with alkanolamines, preferably modified with triethanolamine, by polyisocyanate-polyaddition, where the polyether (carbonate) polyol has a functionality of from 2.5 to 4 and a hydroxyl number of from ≥3 mg KOH/g to ≤112 mg KOH/g (molecular weight from 500 to 18 000). The polyether polyol is preferably "EO capped", i.e. the polyether polyol has terminal ethylene oxide groups. PIPA polyols are described in detail in GB 2 072 204 A, DE 31 03 757 A1 and U.S. Pat. No. 4,374,209 A.

Component A5

As component A5, it is possible to use all polyhydroxy compounds known to those skilled in the art which do not come under the definition of the components A1 to A4, and preferably have an average OH functionality of ≥1.5.

These can be, for example, low molecular weight diols (e.g. 1,2-ethanediol, 1,3- or 1,2-propanediol, 1,4-butanediol), triols (e.g. glycerol, trimethylolpropane) and tetraols (e.g. pentaerythritol), polyester polyols, polythioether polyols or polyacrylate polyols or else polyether polyols or polycarbonate polyols which do not come under the definition of components A1 to A4. It is also possible to use, for example, ethylenediamine- and triethanol-initiated polyethers. These compounds are not counted as compounds according to the definition of component B2.

Component B

As catalysts of the component B1, preference is given to using a) aliphatic tertiary amines (for example trimethylamine, tetramethylbutanediamine, 3-dimethylaminopropylamine, N,N-bis(3-dimethylaminopropyl)-N-isopropanolamine), cycloaliphatic tertiary amines (for example 1,4-diaza[2.2.2]bicyclooctane), aliphatic amino ethers (for example bis(dimethylaminoethyl) ether, 2-(2-dimethylaminoethoxy)ethanol and N,N,N-trimethyl-N-hydroxyethyl(bisaminoethyl ether)), cycloaliphatic amino ethers (for example N-ethylmorpholine), aliphatic amidines, cycloaliphatic amidines, urea and derivatives of urea (for example aminoalkylureas, see, for example, EP-A 0 176 013, in particular (3-dimethylaminopropylamino)urea) and/or b) tin(II) salts of carboxylic acids In particular, the tin(II) salts of carboxylic acids are used, with the parent carboxylic acid in each case having from 2 to 24 carbon atoms. For example, one or more compounds selected from the group consisting of the tin(II) salt of 2-ethylhexanoic acid (i.e. tin(II) 2-ethylhexanoate or tin octoate), the tin(II) salt of 2-butyloctanoic acid, the tin(II) salt of 2-hexyldecanoic acid, the tin(II) salt of neodecanoic acid, the tin(II) salt of isononanoic acid, the tin(II) salt of oleic acid, the tin(II) salt of ricinoleic acid and tin(II) laurate are used as tin(II) salts of carboxylic acids.

In a preferred embodiment of the invention, at least one tin(II) salt of the formula (IX)

$$\text{Sn}(C_xH_{2x+1}COO)_2 \qquad (IX)$$

where x is an integer from 8 to 24, preferably from 10 to 20, particularly preferably from 12 to 18, is used. In formula (IX), the alkyl chain $C_xH_{2x+1}$ of the carboxylate is particularly preferably a branched carbon chain, i.e. $C_xH_{2x+1}$ is an iso-alkyl group.

One or more compounds selected from the group consisting of the tin(II) salt of 2-butyloctanoic acid, i.e. tin(II) 2-butyloctonate, the tin(II) salt of ricinoleic acid, i.e. tin(II) ricinoleate, and the tin(II) salt of 2-hexyldecanoic acid, i.e. tin(II) 2-hexyldecanoate, are most preferably used as tin(II) salts of carboxylic acids.

In another preferred embodiment of the invention, the component B1 used is composed of B1.1 from ≥0.05 to ≤1.5 parts by weight, based on the sum of the parts by weight of components A1 and A2, of urea and/or derivatives of urea and B1.2 from ≥0.03 to ≤1.5 parts by weight, based on the sum of the parts by weight of components A1 and A2, of catalysts other than those of the component B1.2, with the content of amine catalysts in the component B1.2 being not more than 50% by weight based on component B1.

Component B1.1 comprises urea and derivatives of urea. Examples of derivatives of urea are: aminoalkylureas, e.g. (3-dimethylaminopropylamine)urea and 1,3-bis[3-(dimethylamino)propyl]urea. It is also possible to use mixtures of urea and urea derivatives. Preference is given to using exclusively urea in component B1.1. The component B1.1 is used in amounts of from ≥0.05 to ≤1.5 parts by weight, preferably from ≥0.1 to ≤0.5 part by weight, particularly preferably from ≥0.25 to ≤0.35 part by weight, based on the sum of the parts by weight of the components A1 to A2.

The component B1.2 is used in amounts of from ≥0.03 to ≤1.5 parts by weight, preferably from ≥0.03 to ≤0.5 part by weight, particularly preferably from ≥0.1 to ≤0.3 part by weight, very particularly preferably from ≥0.2 to ≤0.3 part by weight, based on the sum of the parts by weight of the components A1 to A2.

The content of amine catalysts in the component B1.2 is preferably not more than 50% by weight based on component B1.1, particularly preferably not more than 25% by weight based on component B1.1. Component B1.2 is very particularly preferably free of amine catalysts.

The above-described tin(II) salts of carboxylic acids, for example, can be used as catalysts of the component B1.2.

As amine catalysts which may be concomitantly used in small amounts (see above), mention may be made of: aliphatic tertiary amines (for example trimethylamine, tetramethylbutanediamine, 3-dimethylaminopropylamine, N,N-bis(3-dimethylaminopropyl)-N-isopropanolamine), cycloaliphatic tertiary amines (for example 1,4-diaza[2.2.2] bicyclooctane), aliphatic amino ethers (for example bisdimethylaminoethyl ether, 2-(2-dimethylaminoethoxy)ethanol and N,N,N-trimethyl-N-hydroxyethyl(bisaminoethyl ether)), cycloaliphatic amino ethers (for example N-ethylmorpholine), aliphatic amidines and cycloaliphatic amidines.

The "amine catalysts" specified in B1.2 do not include urea or derivatives thereof.

The invention therefore also provides a process for producing polyurethane foams, characterized in that
component A containing polyether carbonate polyol having a hydroxyl number in accordance with DIN 53240 of from ≥20 mg KOH/g to ≤120 mg KOH/g (component A1),
is reacted in nonalkaline-medium with
C water and/or physical blowing agents and
D diisocyanates and/or polyisocyanates,
where the production reaction is carried out at an index of from ≥90 to ≤120, characterized in that the production reaction is carried out in the presence of component K.

The nonalkaline medium can preferably be achieved by using urea and/or derivatives of urea as catalysts of component B1 and not using any amine catalysts.

The invention therefore preferably provides a process for producing polyurethane foams, characterized in that
A1 one or more polyether carbonate polyols having a hydroxyl number in accordance with DIN 53240 of from ≥20 mg KOH/g to ≤120 mg KOH/g,
B1 in the presence of urea and/or derivatives of urea and in the absence of amine catalysts are reacted with
C water and/or physical blowing agents and
D diisocyanates and/or polyisocyanates,
in nonalkaline medium, with the production reaction being carried out at an index of from ≥90 to ≤120, characterized in that the production reaction is carried out in the presence of component K.

As component B2, use is made of auxiliaries and additives such as
a) surface-active additives such as emulsifiers and foam stabilizers, in particular ones having low emission, for example products of the Tegostab® LF2 series,
b) additives such as reaction retarders (e.g. acidic substances such as hydrochloric acid or organic acid halides), cell regulators (for example paraffins or fatty alcohols or dimethylpolysiloxanes), pigments, dyes, flame retardants (different from component K3; for example ammonia polyphosphate), further stabilizers against aging and weathering influences, antioxidants, plasticizers, fungistatic and bacteriostatic substances, fillers (for example barium sulfate, kieselguhr, carbaneous chalk or prepared chalk) and blowing agents.

These auxiliaries and additives which may be concomitantly used are, for example, described in EP-A 0 000 389, pages 18-21. Further examples of auxiliaries and additives which may be concomitantly used according to the invention and details regarding the use and mode of action of these auxiliaries and additives are described in Kunststoff-Handbuch, volume VII, edited by G. Oertel, Carl-Hanser-Verlag, Munich, 3rd edition, 1993, e.g. on pages 104-127.

Component C

Water and/or physical blowing agents are used as component C. As physical blowing agents, use is made of, for example, carbon dioxide and/or volatile organic substances as blowing agents. Preference is given to using water as component C.

Component D

Suitable diisocyanates and/or polyisocyanates are aliphatic, cycloaliphatic, araliphatic, aromatic and heterocyclic polyisocyanates, as are described, for example, by W. Siefken in Justus Liebigs Annalen der Chemie, 562, pages 75 to 136, for example those of the formula (X)

$$Q(NCO)_n, \qquad (X)$$

where
n=2-4, preferably 2-3,
and
Q is an aliphatic hydrocarbon radical having 2-18, preferably 6-10, carbon atoms, a cycloaliphatic hydrocarbon radical having 4-15, preferably 6-13, carbon atoms or an araliphatic hydrocarbon radical having 8-15, preferably 8-13, carbon atoms.

The polyisocyanates are, for example, polyisocyanates as are described in EP-A 0 007 502, pages 7-8. Preference is generally given to the readily industrially obtainable polyisocyanates, for example tolylene 2,4- and 2,6-diisocyanate and any desired mixtures of these isomers ("TDI"); polyphenylpolymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which are derived from tolylene 2,4- and/or 2,6-diisocyanate or from diphenylmethane 4,4'- and/or 2,4'-diisocyanate. Preference is given to using one or more compounds selected from the group consisting of tolylene 2,4- and 2,6-diisocyanate, diphenylmethane 4,4'- and 2,4'- and 2,2'-diisocyanate and polyphenylpolymethylene polyisocyanate ("multiring MDI") as polyisocyanate. Particular preference is given to using tolylene 2,4- and/or 2,6-diisocyanate.

In a further embodiment of the process of the invention, the isocyanate component B comprises a tolylene diisocyanate isomer mixture composed of from 55 to 90% by weight of 2,4-TDI and from 10 to 45% by weight of 2,6-TDI.

In a further embodiment of the process of the invention, the isocyanate component D comprises 100% of tolylene 2,4-diisocyanate.

In one embodiment of the process of the invention, the index is from ≥90 to ≤120. The index is preferably in the range from ≥100 to ≤115, particularly preferably from ≥102 to ≤110. The index indicates the percentage ratio of the amount of isocyanate actually used to the stoichiometric amount, i.e. the amount calculated for reaction of the OH equivalents, of isocyanate groups (NCO).

$$\text{Index} = (\text{amount of isocyanate used}):(\text{calculated amount of isocyanate}) \cdot 100 \tag{XI}$$

Component K

Component K is selected from among one or more compounds of the group consisting of the components K1, K2 and K3, which are described below.

Component K1

As component K1, use is made of esters of monobasic or polybasic carboxylic acids, with the pKa values of the (first) dissociation of the carboxylic acids being from 0.5 to 4.0, preferably from 1.0 to 3.0. The pKa values of the (first) dissociation of the carboxylic acids were determined in aqueous solution. Possible acid components are, for example alkyl monocarboxylic acids such as formic acid, aryl monocarboxylic acids such as α-naphthoic acid, alkyl polycarboxylic acids such as oxalic acid, malonic acid, maleic acid, fumaric acid, citric acid and aryl polycarboxylic acids such as the isomers and alkyl-substituted derivatives of phthalic acid, trimellitic acid, pyromellitic acid, the isomers of naphthalenedicarboxylic acid and cyclic diesters of α-hydroxycarboxylic acids such as mandelic acid or lactic acid. Preference is given to using saturated or unsaturated C2-C4-alkyl polycarboxylic acids, particularly preferable oxalic acid. Possible alcohol components are, for example, aliphatic monools and polyols such as methanol, ethanol, propanol, isopropanol, ethylene glycol, 1,2- and 1,3-propanediol, the isomers of butanediol, 2-butene-1,4-diol, 2-butyne-1,4-diol, neopentyl glycol, glycerol, trimethylolpropane, pentaerythritol, and as aryl alcohols phenol and alkyl-substituted derivatives thereof, naphthol and alkyl-substituted derivatives thereof, hydroquinone, resorcinol and trihydroxybenzene. Preference is given to aliphatic monools, in particular methanol, ethanol, n-propanol or isopropanol, n-butanol, isobutanol, or tert-butanol. Particular preference is given to using the methyl and ethyl esters of oxalic acid and/or malonic acid, most preferably diethyl oxalate, as component K1.

Component K2

Component K2 comprises monosulfonates, disulfonates and polysulfonates of monofunctional and polyfunctional alcohols.

Preference is given to using monosulfonates, disulfonates and polysulfonates of monofunctional and polyfunctional alcohols, with the sulfonate groups being derived from the isomers of toluenesulfonic acid, substituted benzenesulfonic and toluenesulfonic acids, alkylsulfonic acids or naphthylsulfonic acids, as component K2. The sulfonate groups are preferably derived from methanesulfonic acid or the toluenesulfonic acids, in particular p-toluenesulfonic acid. Suitable alcohol components of the monosulfonates, disulfonates and polysulfonates are monofunctional, bifunctional, trifunctional, tetrafunctional and higher-functionality alcohols and/or polyols. Thus, it is possible to use, for example, aliphatic monools and polyols such as methanol, ethanol, propanol, isopropanol, n-butanol, isobutanol or tert-butanol, ethanediol, 1,2-propanediol, 1,3-propanediol, the isomers of butanediol, 2-butene-1,4-diol, 2-butyne-1,4-diol, neopentyl glycol, glycerol, trimethylolpropane, pentaerythritol, polyethylene glycols and polypropylene glycols having a molar mass of 100-2000 g/mol, preferably from 200 to 600 g/mol, aryl alcohols such as phenol and alkyl-substituted derivatives thereof, naphthol and alkyl-substituted derivatives thereof, hydroquinone, resorcinol, bisphenols (e.g. bisphenol A) or trihydroxybenzene. Preference is given to using aliphatic monools, in particular methanol, ethanol, n-propanol or isopropanol, n-butanol, isobutanol or tert-butanol.

Suitable components K2 also include mixtures of (C10-C21) phenyl alkanesulfonates, which are, for example, commercially available under the tradenames Mesamoll and Mesamoll II.

Particular preference is given to using methyl para-toluenesulfonate and/or mixtures of (C10-C21) phenyl alkanesulfonates as component K2, with greatest preference being given to using methyl para-toluenesulfonate.

Component K3

Component K3 is selected from among one or more compounds of the group consisting of the components K3.1, K3.2 and K3.3, which are described below.

As component K3.1, use is made of esters of phosphoric acid, phosphonic acid, phosphorous acid, phosphinic acid, phosphonous acid and phosphinous acid, with these esters each not containing any P—OH group. Component K3.1 is preferably selected from among at least one ester from the group consisting of esters of phosphonic acid with monofunctional and/or bifunctional alcohols, esters of phosphoric acid with monofunctional and/or bifunctional alcohols and alkoxylated phosphoric acid, with these esters in each case not containing any P—OH group.

Component K3.1 is particularly preferably selected from among at least one ester of the group consisting of esters of phosphoric acid with monofunctional and/or bifunctional aliphatic alcohols and ethoxylated phosphoric acid, with the esters in each case not containing any P—OH group.

Suitable phosphoric esters are, for example, triesters of phosphoric acid, tetraesters of pyrophosphoric acid (diphosphoric acid) and tetraesters or polyesters of polyphosphoric acid and alcohols having from 1 to 30 carbon atoms, with these esters in each case not containing any P—OH group. Examples of compounds suitable as component K3.1 are the following: trimethyl phosphate, triethyl phosphate, tripropyl phosphate, tributyl phosphate, trioctyl phosphate, tris(2-ethylhexyl) phosphate, tris (2-butoxyethyl) phosphate, tris (2-chloroisopropyl) phosphate (TCPP), cyclopropylmethyl diethyl phosphate, diethyl 3-butenyl phosphate, triphenyl phosphate and tricresyl phosphate. Preference is also given to using alkoxylated phosphoric acid. Alkoxylated phosphoric acids are reaction products of phosphoric acid with alkylene oxides, preferably with ethylene oxide and/or propylene oxide, particularly preferably with ethylene oxide. Alkoxylated phosphoric acid is preferably obtained by direct reaction of phosphoric acid with alkylene oxides without addition of a catalyst, with the phosphoric acid being able to be used in pure form or as aqueous solution (for example in the form of an 85% strength by weight solution).

As component K3.2, use is made of oligomeric alkyl phosphates of the general formula (II),

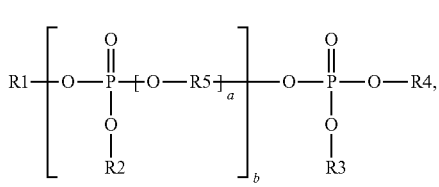

where
a is an integer from 1 to 10,
b is an integer from 1 to 10,
R1, R2, R3, R4 are alkyl groups having at least one carbon atom, preferably C1-C6-alkyl, where R1, R2, R3, R4 are identical or independently different from one another, and R5 is a linear alkylene group having at least two carbon atoms or a branched alkylene group having at least three carbon atoms, preferably a linear alkylene group having from two to ten carbon atoms or a branched alkylene group having from three to ten carbon atoms.

An oligomeric alkyl phosphate of the general formula (II) above which is preferably used is, for example, the flame retardant Fyrol™ PNX (ICL Industrial Products) which is available as commercial product.

As component K3.3, use is made of oligomeric alkyl phosphates of the general formula (III),

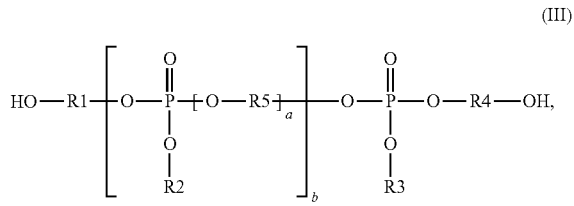

where
a is an integer from 1 to 10,
b is an integer from 1 to 10,
R1, R4, R5 are linear alkylene groups having at least two carbon atoms or branched alkylene groups having at least three carbon atoms, preferably linear alkylene groups having from two to ten carbon atoms or branched alkylene groups having from three to ten carbon atoms, where R1, R4, R5 are identical or independently different from one another, and R2, R3 are alkyl groups having at least one carbon atom, preferably C1-C6-alkyl, where R2 and R3 are identical or independently different from one another.

An oligomeric alkyl phosphate of the general formula (III) above which is preferably used is, for example, the flame retardant Exolit® OP 550 (Clamant) which is available as commercial product.

Component K can be used in an amount of from ≥0.5 to ≤8.0 parts by weight, preferably from ≥1.0 to ≤5.0 parts by weight, particularly preferably from ≥2.0 to ≤5.0 parts by weight, where the parts by weight figures for the component K are based on the sum of the parts by weight of the components A1+A2=100 parts by weight. It has been found that an excessive amount of component K influences the mechanical properties of the flexible foam compared to the zero value (without component K) to an undesirable extent. For economic reasons, higher contents of component K also tend to be disadvantageous.

To produce the polyurethane foams, the reaction components are reacted by the single-step process known per se, often with the aid of mechanical devices, e.g. those described in EP-A 355 000. Details of processing apparatuses which are also possible according to the invention are described in Kunststoff-Handbuch, volume VII, edited by Vieweg and Höchtlen, Carl-Hanser-Verlag, Munich 1993, e.g. on pages 139 to 265.

The polyurethane foams are preferably in the form of flexible polyurethane foams and may be produced as molded foams or else as slabstock foams, preferably as slabstock foams. The invention therefore provides a process for producing the polyurethane foams, the polyurethane foams produced by these processes, the flexible polyurethane slabstock foams/flexible polyurethane molded foams produced by these processes, the use of the flexible polyurethane foams for production of moldings, and the moldings themselves.

The polyurethane foams, preferably flexible polyurethane foams, obtainable according to the invention are employed, for example, in the following applications: furniture upholstery, textile inserts, mattresses, automobile seats, headrests, armrests, sponges, foam sheets for use in automobile components, for example roof linings, door trim, seat cushions and structural elements.

The flexible foams of the invention have a foam density in accordance with DIN EN ISO 3386-1-98 in the range from ≥16 to ≤60 kg/m³, preferably from ≥20 to ≤50 kg/m³.

In a first embodiment, the invention accordingly provides a process for producing polyurethane foams by reaction of
component A containing polyether carbonate polyol having a hydroxyl number in accordance with DIN 53240 of from ≥20 mg KOH/g to ≤120 mg KOH/g (component A1),
B optionally
  B1) catalysts and/or
  B2) auxiliaries and additives
C water and/or physical blowing agents
with
D diisocyanates and/or polyisocyanates,
with the production reaction being carried out at an index of from ≥90 to ≤120, characterized in that the production reaction is carried out in the presence of component K with component K being selected from among one or more compounds of the group consisting of
K1 esters of monobasic or polybasic carboxylic acids whose (first) dissociation has a pKa of from 0.5 to 4.0,
K2 monosulfonates, disulfonates and polysulfonates of monofunctional and polyfunctional alcohols and
K3 one or more compounds selected from the group consisting of
  K 3.1 esters of phosphoric acid, phosphonic acid, phosphorous acid, phosphinic acid, phosphonous acid and phosphinous acid, with these esters in each case not containing any P—OH group,
  K3.2 oligomeric alkyl phosphates of the general formula (II),

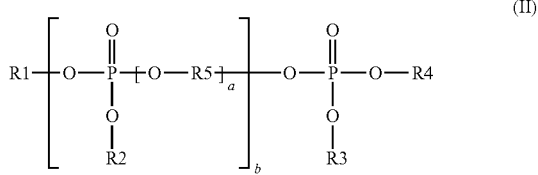

where
a is an integer from 1 to 10,
b is an integer from 1 to 10,
R1, R2, R3, R4 are alkyl groups having at least one carbon atom, where
R1, R2, R3, R4 are identical or independently different from one another, and
R5 is a linear alkylene group having at least two carbon atoms or a branched alkylene group having at least three carbon atoms, and
K3.3 oligomeric alkyl phosphates of the general formula (III),

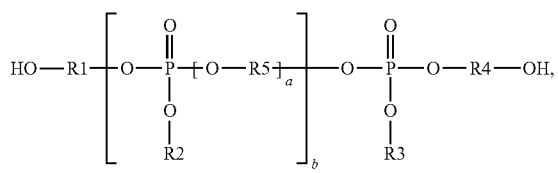

(III)

where
a is an integer from 1 to 10,
b is an integer from 1 to 10,
R1, R4, R5 are linear alkylene groups having at least two carbon atoms or branched alkylene groups having at least three carbon atoms, where
R1, R4, R5 are identical or independently different from one another, and
R2, R3 are alkyl groups having at least one carbon atom, where R2 and
R3 are identical or independently different from one another,
and component K is preferably used in an amount of from ≥1.0 to ≤5.0 parts by weight, particularly preferably from ≥2.0 to ≤5.0 parts by weight, where all parts by weight figures for the component K are based on the sum of the parts by weight of the components A1+A2=100 parts by weight.

In a second embodiment, the invention provides a process according to the first embodiment, wherein component A has the following composition:
A1 from ≥40 to ≤100 parts by weight of one or more polyether carbonate polyols having a hydroxyl number in accordance with DIN 53240 of from ≥20 mg KOH/g to ≤120 mg KOH/g,
A2 from ≤60 to ≥0 parts by weight of one or more polyether polyols having a hydroxyl number in accordance with DIN 53240 of from ≥20 mg KOH/g to ≤250 mg KOH/g and a content of ethylene oxide of from ≥0 to ≤60% by weight, with the polyether polyols A2 being free of carbonate units,
A3 from ≤20 to ≥0 parts by weight, based on the sum of the parts by weight of the components A1 and A2, of one or more polyether polyols having a hydroxyl number in accordance with DIN 53240 of from ≥20 mg KOH/g to ≤250 mg KOH/g and a content of ethylene oxide of ≥60% by weight, with the polyether polyols A3 being free of carbonate units,
A4 from ≤40 to ≥0 parts by weight, based on the sum of the parts by weight of the components A1 and A2, of one or more polymer polyols, PUD polyols and/or PIPA polyols,
A5 from ≤40 to ≥0 parts by weight, based on the sum of the parts by weight of the components A1 and A2, of polyols which do not come under the definition of the components A1 to A4,
where all parts by weight figures for the components A1, A2, A3, A4, A5 are normalized so that the sum of the parts by weight of A1+A2 in the composition is 100.

In a third embodiment, the invention provides a process according to the first or second embodiment, wherein component K is used in an amount of from ≥0.5 to ≤8.0 parts by weight, preferably from ≥1.0 to ≤5.0 parts by weight, particularly preferably from ≥2.0 to ≤5.0 parts by weight, where all parts by weight for the component K are based on the sum of the parts by weight of the components A1+A2=100 parts by weight.

In a fourth embodiment, the invention provides a process according to any of the embodiments 1 to 3, wherein
B1 catalysts such as
a) aliphatic tertiary amines, cycloaliphatic tertiary amines, aliphatic amino ethers, cycloaliphatic amino ethers, aliphatic amidines, cycloaliphatic amidines, urea and derivatives of urea and/or
b) tin(II) salts of carboxylic acids and
B2) optionally auxiliaries and additives
are used as component B.

In a fifth embodiment, the invention provides a process according to any of the embodiments 1 to 3, wherein
B1 catalysts and
B2) optionally auxiliaries and additives
are used as component B,
where
B1.1 from ≥0.05 to ≤1.5 parts by weight, based on the sum of the parts by weight of the components A1 and A2, of urea and/or derivatives of urea and
B1.2 from ≥0.03 to ≤1.5 parts by weight, based on the sum of the parts by weight of the components A1 and A2, of catalysts other than those of the components B1.2, with the content of amine catalysts in the component B1.2 being not more than 50% by weight based on components B1,
are used as component B1.

In a sixth embodiment, the invention provides a process according to any of the embodiments 2 to 5, wherein component A is free of components A3 and/or A4.

In a seventh embodiment, the invention provides a process according to any of the embodiments 1 to 6, wherein component A comprises:
A1 from ≥65 to ≤75 parts by weight of one or more polyether carbonate polyols having a hydroxyl number in accordance with DIN 53240 of from ≥20 mg KOH/g to ≤120 mg KOH/g, and
A2 from ≤35 to ≥25 parts by weight of one or more polyether polyols having a hydroxyl number in accordance with DIN 53240 of from ≥20 mg KOH/g to ≤250 mg KOH/g and a content of ethylene oxide of from ≥0 to ≤60% by weight, with the polyether polyols A2 being free of carbonate units.

In an eighth embodiment, the invention provides a process according to any of the embodiments 1 to 7, wherein component A1 comprises a polyether carbonate polyol which is obtained by copolymerization of carbon dioxide and one or more alkylene oxides in the presence of one or more H-functional starter modules, with the polyether carbonate polyol preferably having a $CO_2$ content of from 15 to 25% by weight.

In a ninth embodiment, the invention provides a process according to any of the embodiments 1 to 8, wherein component K is selected from among one or more compounds of the group consisting of
- K1 methyl esters of oxalic acid, ethyl esters of oxalic acid, methyl esters of malonic acid and ethyl esters of malonic acid,
- K2 methyl para-toluene sulfonate and mixtures of (C10-C21) phenyl alkanesulfonates,
- K3.1 triesters of phosphoric acid, tetraesters of pyrophosphoric acid, tetraesters or polyesters of polyphosphoric acid and alcohols having from 1 to 30 carbon atoms, with these esters in each case not containing any P—OH group, or alkoxylated phosphoric acid,
- K3.2 oligomeric alkyl phosphates of the general formula (II), where
  - a is an integer from 1 to 10,
  - b is an integer from 1 to 10,
  - R1, R2, R3, R4 are each C1-C6-alkyl, where R1, R2, R3, R4 are identical or independently different from one another, and
  - R5 is a linear alkylene group having from two to ten carbon atoms or a branched alkylene group having from three to ten carbon atoms,
- K3.3 oligomeric alkyl phosphates of the general formula (III), where
  - a is an integer from 1 to 10,
  - b is an integer from 1 to 10,
  - R1, R4, R5 are linear alkylene groups having from two to ten carbon atoms or branched alkylene groups having from three to ten carbon atoms, where R1, R4, R5 are identical or independently different from one another, and
  - R2, R3 are each C1-C6-alkyl, where R2 and R3 are identical or independently different from one another.

In a tenth embodiment, the invention provides a process according to any of the embodiments 1 to 8, wherein
K3.1 is selected from among one or more compounds of the group consisting of trimethyl phosphate, triethyl phosphate, tripropyl phosphate, tributyl phosphate, trioctyl phosphate, tri(2-ethylhexyl) phosphate, tris(2-butoxyethyl) phosphate, tris(2-chloroisopropyl) phosphate (TCPP), cyclopropylmethyl diethyl phosphate, diethyl 3-butenyl phosphate, triphenyl phosphate, tricresyl phosphate and a reaction product of phosphoric acid with ethylene oxide and/or propylene oxide.

In an eleventh embodiment, the invention provides a process according to any of the embodiments 1 to 10, wherein a component B which contains at least one tin(II) salt of the formula (IX)

$$Sn(C_xH_{2x+1}COO)_2 \quad (IX),$$

where x is an integer from 8 to 24, preferably from 10 to 20, particularly preferably from 12 to 18, is used.

In a twelfth embodiment, the invention provides a process according to any of the embodiments 1 to 11, wherein 2,4- and/or 2,6-TDI is used as isocyanate component in component C.

In a thirteenth embodiment, the invention provides polyurethane foams obtainable by a process according to any of the embodiments 1 to 12.

In a fourteenth embodiment, the invention provides polyurethane foams according to the thirteenth embodiment, wherein the foams are flexible polyurethane foams.

In a fifteenth embodiment, the invention provides for the use of the polyurethane foams according to embodiment 13 or 14 for producing furniture upholstery, textile inserts, mattresses, automobile seats, headrests, armrests, sponges, foam sheets for use in automobile components such as roof liners, door trim, seat cushions and components.

EXAMPLES

Test Methods:
Experimentally determined OH numbers (hydroxyl number) were determined by the method of DIN 53240.
Experimentally determined acid numbers were determined by the method of DIN 53402.
Emission determination: cyclic propylene carbonate and secondary components:
Headspace GC and headspace GC/MS for cyclic propylene carbonate in flexible foam specimens:
A flexible foam specimen of about 100 mg weighed to within about ±0.3 mg is introduced into a 22 ml headspace glass vial, carefully closed with a silicone septum and heated at 140° C. in the preheated oven of the headspace autosampler (PerkinElmer Turbomatrix, serial number M41L0505273) for 15 minutes. The vapor space is subsequently injected at a pressure of 2.35 bar in a stream of helium into the injector block of the gas chromatograph (Thermo Scientific, Trace-GC-Ultra, serial number 6201252621). The injection volume is divided over two identical, nonpolar columns of the type Rxi-5Sil MS (Restek, 20 m length, 0.15 mm internal diameter, 2.0 μm layer thickness). The oven temperature is at 45° C. for 2 minutes and is brought at 12° C./min to 150° C. and at 45° C./min to 310° C. The one column leads to the flame ionization detector (FID). The other ends in a directly coupled quadrupole mass spectrometer with 70 eV electron impact ionization (Thermo Scientific, ISQ-MS, serial number ISQ121046). The cyclic propylene carbonate (CAS No. 108-32-7) is measured quantitatively by means of FID response and its identity confirmed by GC/MS.

Example 1

Preparation of the Ethoxylated Phosphoric Acid Component K3.1-1:
290 g of phosphoric acid (85% strength aqueous solution) were placed in a 2 liter pressure reactor and heated to 55° C. while stirring. After changing five times between nitrogen and vacuum in the range from 0.1 to 3.0 bar (absolute), the pressure in the reactor was set by means of nitrogen to 2.1 bar (absolute). 1816 g of ethylene oxide were subsequently metered into the reactor at 55° C. over a period of 6.5 hours. After an after-reaction time of 3 hours at 55° C., volatile components were distilled off at 90° C. under reduced pressure (10 mbar (absolute)) for 30 minutes and the reaction mixture was then cooled to room temperature. Ethoxylated phosphoric acid in polyethylene glycol having the following properties was obtained:
OH number: 353 mg KOH/g
Acid number: 0.0 mg KOH/g The present invention will be illustrated with the aid of the following examples, but without being restricted thereto. The items have the following meanings:
A1-1: trifunctional polyether carbonate polyol, OH number 56 mg KOH/g, prepared by copolymerization of 80% by weight of propylene oxide and 20% by weight of carbon dioxide in glycerol as H-functional starter compound in the presence of a double metal cyanide catalyst.
A2-1: trifunctional polyether polyol based on glycerol and having a hydroxyl number of 48 mg KOH/g, obtained by copolymerization of 12% by weight of ethylene oxide with 88% by weight of propylene oxide.

B1-1: Niax Catalyst A-1: Commercial product from Momentive Performance Materials GmbH, Leverkusen, bis[2-(N,N'-dimethylamino)ethyl]ether B1-2: DABCO T-9, commercial product of Air Products GmbH, Hamburg, tin 2-ethylhexanoate B1-3: Kosmos EF, tin(II) ricinoleate preparation, Evonik Nutrition & Care GmbH, Essen B2-1: Tegostab BF 2370, commercial product, Evonik Nutrition & Care GmbH, Essen C-1: Water D-1: Desmodur T 80, mixture of tolylene 2,4'-diisocyanate and tolylene 2,6'-diisocyanate in a ratio of 80/20, Covestro AG, Leverkusen D-2: Desmodur T 65, mixture tolylene 2,4'-diisocyanate and tolylene 2,6'-diisocyanate in a ratio of 65/35, Covestro AG, Leverkusen K1-1: diethyl oxalate, Sigma-Aldrich Chemie GmbH, Munich K2-1: methyl para-toluenesulfonate, Sigma-Aldrich Chemie GmbH, Munich K3.1-1: ethoxylated phosphoric acid, prepared as in example 1

K3.2-1: Fyrol PNX-LE, oligomeric alkyl phosphate, ICL-IP Bitterfeld GmbH, Bitterfeld The flexible polyurethane foams described in tables 1 and 2 were produced using a conventional industrial batchwise foaming plant without floating lid and having a base area of 1 m×1 m. The height of the foam blocks was about 80 cm.

Mixing of the components was carried out by means of a stirrer in a metal cylinder which was removed mechanically from the foam mold after addition of the isocyanate.

The compressive strength and foam density of the foams were determined in accordance with DIN EN ISO 3386-1.

The emission determination for determining the cyclic polypropylene carbonate was carried out as indicated above.

Results:

Without component K, the resulting flexible foam displayed a relatively high emission of cyclic propylene carbonate (comparative example 2); when a component K was used, lower values for cyclic propylene carbonate were found in the emission determination, in particular from an amount of 1.0 part by weight of component K, and more pronounced in the experiments using 2.0 and 5.0 parts by weight. Component K was found to produce a further lowering of the values for cyclic propylene carbonate in the emission determination.

TABLE 1

| COMPONENT | | Example 2 (comp.) | 3 | 4 | 5 | 6 | 7 |
|---|---|---|---|---|---|---|---|
| A1-1 | [parts by weight] | 70 | 70 | 70 | 70 | 70 | 70 |
| A2-1 | [parts by weight] | 30 | 30 | 30 | 30 | 30 | 30 |
| C-1 | [parts by weight] | 4.50 | 4.50 | 4.50 | 4.50 | 4.50 | 4.50 |
| B2-1 | [parts by weight] | 1.0 | 1.0 | 1.0 | 1.0 | 1.0 | 1.0 |
| B1-1 | [parts by weight] | 0.12 | 0.12 | 0.12 | 0.12 | 0.12 | 0.12 |
| B1-2 | [parts by weight] | 0.18 | 0.18 | 0.18 | 0.18 | 0.18 | — |
| B1-3 | [parts by weight] | — | — | — | — | — | 0.60 |
| K1-1 | [parts by weight] | — | — | 2.0 | — | — | — |
| K2-1 | [parts by weight] | — | — | — | 2.0 | — | — |
| K3.1-1 | [parts by weight] | — | — | — | — | 2.0 | 2.0 |
| K3.2-1 | [parts by weight] | — | 2.0 | — | — | — | — |
| D-1 | [parts by weight] | 56.0 | 56.0 | 56.0 | 56.0 | 57.2 | 57.2 |
| Index | | 108 | 108 | 108 | 108 | 108 | 108 |
| Foam density | kg m$^{-3}$ | 21.6 | 21.6 | 21.2 | 22.3 | 21.4 | 21.5 |
| Compressive strength at 40% compression | KPa | 4.46 | 3.93 | 2.81 | 3.40 | 5.31 | 4.22 |
| Cycl. propylene carbonate | [mg m$^{-3}$] | 130 | 16 | 17 | 6 | 50 | 28 |

TABLE 2

| COMPONENT | | Example 8 | 9 | 10 | 11 | 12 | 13 |
|---|---|---|---|---|---|---|---|
| A1-1 | [parts by weight] | 70 | 70 | 70 | 70 | 70 | 70 |
| A2-1 | [parts by weight] | 30 | 30 | 30 | 30 | 30 | 30 |
| C-1 | [parts by weight] | 4.50 | 4.50 | 4.50 | 4.50 | 4.50 | 4.50 |
| B2-1 | [parts by weight.] | 1.0 | 1.0 | 1.0 | 1.0 | 1.0 | 1.0 |
| B1-1 | [parts by weight] | 0.12 | 0.12 | 0.12 | 0.12 | 0.12 | 0.12 |
| B1-2 | [parts by weight] | 0.18 | 0.18 | 0.18 | 0.18 | 0.18 | — |
| B1-3 | [parts by weight] | — | — | — | — | — | 0.60 |
| K2-1 | [parts by weight] | — | — | — | — | — | — |
| K3.1-1 | [parts by weight] | — | — | — | — | 5.0 | — |
| K3.2-1 | [parts by weight] | 0.2 | 0.5 | 1.0 | 5.0 | — | 2.0 |
| K1-1 | [parts by weight] | — | — | — | — | — | — |
| D-1 | [parts by weight] | 56.0 | 56.0 | 56.0 | 56.0 | 29.4 | 56.0 |
| D-2 | | — | — | — | — | 29.4 | — |
| Index | | 108 | 108 | 108 | 108 | 108 | 108 |
| foam density | kg m$^{-3}$ | 21.3 | 21.1 | 21.1 | 21.6 | 22.5 | 22.1 |
| Compressive strength at 40% compression | kPa | 3.89 | 3.82 | 3.40 | 3.86 | 3.80 | 3.31 |
| Cycl. propylene carbonate | [mg m$^{-3}$] | 120 | 110 | 16 | 7 | 4 | 10 |

The invention claimed is:

1. A process for producing polyurethane foams comprising reacting a component A comprising A1 a polyethercarbonate polyol having a hydroxyl number in accordance with DIN 53240 of from ≥20 mg KOH/g to ≤120 mg KOH/g, and optionally, A2 one or more polyether polyols having a hydroxyl number in accordance with DIN 53240 of from ≥20 mg KOH/g to ≤250 mg KOH/g and a content of oxyethylene units of from ≥0 to ≤60% by weight, with said polyether polyols A2 being free of carbonate units, with a component D comprising one or more diisocyanates and/or polyisocyanates, wherein the reaction is carried out at an isocyanate index of from ≥90 to ≤120, and in the presence of an optional component B, a component C, and a component K, wherein optional component B comprises B1) a catalyst, and/or B2) auxiliaries and additives; component C comprises water and/or physical blowing agents; and component K comprising a reaction product of phosphoric acid with ethylene oxide, and component K is present in an amount of from ≥1.0 to ≤5.0 parts by weight, where all parts by weight for component K are based on the sum of the parts by weight of the components A1+A2=100 parts by weight.

2. The process as claimed in claim 1, wherein component A comprises:

A1 from ≥40 to ≤100 parts by weight of one or more polyether carbonate polyols having a hydroxyl number in accordance with DIN 53240 of from ≥20 mg KOH/g to ≤120 mg KOH/g, A2 from ≤60 to ≥0 parts by weight of one or more polyether polyols having a hydroxyl number in accordance with DIN 53240 of from ≥20 mg KOH/g to ≤250 mg KOH/g and a content of oxyethylene units of from ≥0 to ≤60% by weight, with said polyether polyols A2 being free of carbonate units, A3 from ≤20 to ≥0 parts by weight, based on the sum of the parts by weight of the components A1 and A2, of one or more polyether polyols having a hydroxyl number in accordance with DIN 53240 of from ≥20 mg KOH/g to ≤250 mg KOH/g and a content of oxyethylene units of ≥60% by weight, with said polyether polyols A3 being free of carbonate units, A4 from ≤40 to ≥0 parts by weight, based on the sum of the parts by weight of the components A1 and A2, of one or more polymer polyols, PUD polyols and/or PIPA polyols, A5 from ≤40 to ≥0 parts by weight, based on the sum of the parts by weight of the components A1 and A2, of polyols which do not come under the definition of the components A1 to A4, wherein all parts by weight for components A1, A2, A3, A4 and A5 are normalized so that the sum of the parts by weight of A1+A2 in the composition equals 100 parts by weight.

3. The process as claimed in claim 1, wherein component K is present in an amount of from ≥2.0 to ≤5.0 parts by weight, where all parts by weight for the component K are based on the sum of the parts by weight of the components A1+A2=100 parts by weight.

4. The process as claimed in claim 1, wherein the reaction occurs in the presence of component B which comprises B1 a catalyst comprising at least one of a) aliphatic tertiary amines, cycloaliphatic tertiary amines, aliphatic amino ethers, cycloaliphatic amino ethers, aliphatic amidines, cycloaliphatic amidines, urea, and derivatives of urea and/or b) tin(II) salts of carboxylic acids and B2 optionally auxiliaries and additives.

5. The process as claimed in claim 1, wherein the reaction occurs in the presence of component B which comprises at least one of B1 a catalyst, and B2 auxiliaries and additives, wherein B1 said catalyst comprises B1.1 from ≥0.05 to ≤1.5 parts by weight, based on the sum of the parts by weight of the components A1 and A2, of urea and/or derivatives of urea.

6. The process as claimed in claim 2, wherein component A is free of components A3 and/or A4.

7. The process as claimed in claim 1, wherein component A comprises:

A1 from ≥65 to ≤75 parts by weight of one or more polyether carbonate polyols having a hydroxyl number in accordance with DIN 53240 of from ≥20 mg KOH/g to ≤120 mg KOH/g, and A2 from ≤35 to ≥25 parts by weight of one or more polyether polyols having a hydroxyl number in accordance with DIN 53240 of from ≥20 mg KOH/g to ≤250 mg KOH/g and a content of ethylene oxide of from ≥0 to ≤60% by weight, with the polyether polyols A2 being free of carbonate units.

8. The process as claimed in claim 1, wherein component A1 comprises a polyether carbonate polyol which is obtainable by copolymerization of carbon dioxide and one or more alkylene oxides in the presence of one or more H-functional starter molecules, with the polyether carbonate polyol having a $CO_2$ content of from 15 to 25% by weight.

9. The process as claimed in claim 4, wherein B1 said catalyst comprises b) at least one tin(II) salt corresponding to the formula (IX)

$$Sn(C_xH_{2x+1}COO)_2 \qquad (IX)$$

wherein x represents an integer from 8 to 24.

10. The process as claimed in claim 1, wherein component D said one or more diisocyanates and/or polyisocyanates comprise 2,4- and/or 2,6-TDI.

11. A polyurethane foam obtained by the process as claimed in claim 1.

12. The polyurethane foam as claimed in claim 11, wherein the polyurethane foam is a flexible polyurethane foam.

13. A furniture article, a textile insert, bedding or automotive article comprising the polyurethane foam of claim 11.

14. The process as claimed in claim 9, wherein x represents an integer from 10 to 20.

15. The process as claimed in claim 9, wherein x represents an integer from 12 to 18.

16. The process as claimed in claim 1, wherein component K further comprises one or more of:

K1 an ester of one or more of a monobasic and polybasic carboxylic acid whose first dissociation has a pKa of from 0.5 to 4.0, K2 one or more of a monosulfonate, disulfonate or polysulfonate of a monofunctional and/or polyfunctional alcohol, or K3 one or more compounds comprising K 3.1 an ester of one or more of phosphoric acid, phosphonic acid, phosphorous acid, phosphinic acid, phosphonous acid or phosphinous acid, wherein the ester does not contain a P—OH group and is different from the reaction product of phosphoric acid with ethylene oxide, K3.2 an oligomeric alkyl phosphate corresponding to the general formula (II),

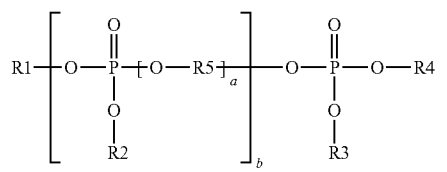

(II)

wherein
a represents an integer from 1 to 10,
b represents an integer from 1 to 10,
R1, R2, R3, R4 each represent an alkyl group having at least one carbon atom, wherein R1, R2, R3, R4 are identical or different from one another, and
R5 represents a linear alkylene group having at least two carbon atoms or a branched alkylene group having at least three carbon atoms, and K3.3 an oligomeric alkyl phosphate corresponding to the general formula (III),

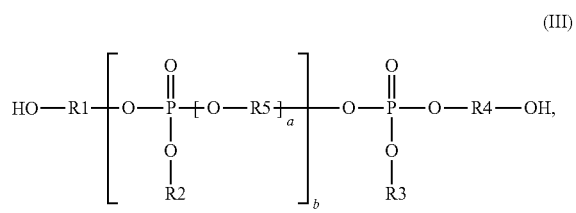

(III)

wherein
a represents an integer from 1 to 10,
b represents an integer from 1 to 10,
R1, R4, R5 each represent a linear alkylene group having at least two carbon atoms or a branched alkylene group having at least three carbon atoms, wherein R1, R4, R5 are identical or different from one another, and R2, R3 each represent an alkyl group having at least one carbon atom, wherein R2 and R3 are identical or different from one another.

* * * * *